(12) United States Patent
James et al.

(10) Patent No.: US 8,940,114 B2
(45) Date of Patent: Jan. 27, 2015

(54) HYBRID MANUFACTURING PROCESS AND PRODUCT MADE USING LAMINATED SHEETS AND COMPRESSIVE CASING

(75) Inventors: Allister W. James, Chuluota, FL (US); Gary B. Merrill, Orlando, FL (US); Iain A. Fraser, Ruckersville, VA (US)

(73) Assignees: Siemens Energy, Inc., Orlando, FL (US); Mikro Systems, Inc., Charlottesville, VA (US)

( * ) Notice: Subject to any disclaimer, the term of this patent is extended or adjusted under 35 U.S.C. 154(b) by 780 days.

(21) Appl. No.: 13/094,985

(22) Filed: Apr. 27, 2011

(65) Prior Publication Data

US 2012/0276361 A1    Nov. 1, 2012

(51) Int. Cl.
*B32B 37/02* (2006.01)
*B28B 1/00* (2006.01)

(52) U.S. Cl.
CPC ........................... *B28B 1/002* (2013.01)
USPC ............ 156/85; 156/86; 239/432; 239/553.5; 239/553.3; 419/5; 419/6

(58) Field of Classification Search
USPC .......................................... 419/5, 6
See application file for complete search history.

(56) References Cited

U.S. PATENT DOCUMENTS

| | | | | |
|---|---|---|---|---|
| 3,584,972 | A | | 6/1971 | Bratkovich et al. |
| 3,872,563 | A | * | 3/1975 | Brown et al. ............ 29/889.721 |
| 4,871,621 | A | * | 10/1989 | Bagley et al. ................. 428/549 |
| 6,048,432 | A | * | 4/2000 | Ecer .............................. 156/263 |
| 6,709,230 | B2 | | 3/2004 | Morrison et al. |
| 7,141,812 | B2 | | 11/2006 | Appleby et al. |
| 7,153,096 | B2 | | 12/2006 | Thompson et al. |
| 7,247,003 | B2 | * | 7/2007 | Burke et al. ............. 416/229 R |
| 7,255,535 | B2 | | 8/2007 | Albrecht et al. |
| 7,550,107 | B2 | | 6/2009 | Morrison et al. |
| 7,686,577 | B2 | | 3/2010 | Morrison et al. |
| 2005/0254942 | A1 | | 11/2005 | Morrison et al. |
| 2006/0120874 | A1 | | 6/2006 | Burke et al. |
| 2008/0279678 | A1 | | 11/2008 | Merrill et al. |

* cited by examiner

*Primary Examiner* — George Wyszomierski
*Assistant Examiner* — Ngoclan T Mai

(57) ABSTRACT

Fabricating a core of a component (34A, 34B, 34C) from a stack (25, 36) of sheets (20) of material with cutouts (22A) in the sheets aligned to form passages (38) in the core. A casing preform (28) is then fitted over the core. The preform is processed to form a casing (29) that brackets at least parts of opposed ends of the stack. Shrinkage of the casing during processing compresses (46) the sheets together. The preform may slide (52) over the core, and may be segmented (28A, 28B, 28C) to fit over the core. A hoop (66) may be fitted and compressed around the segmented casing (29A, 29B, 29C).

16 Claims, 6 Drawing Sheets

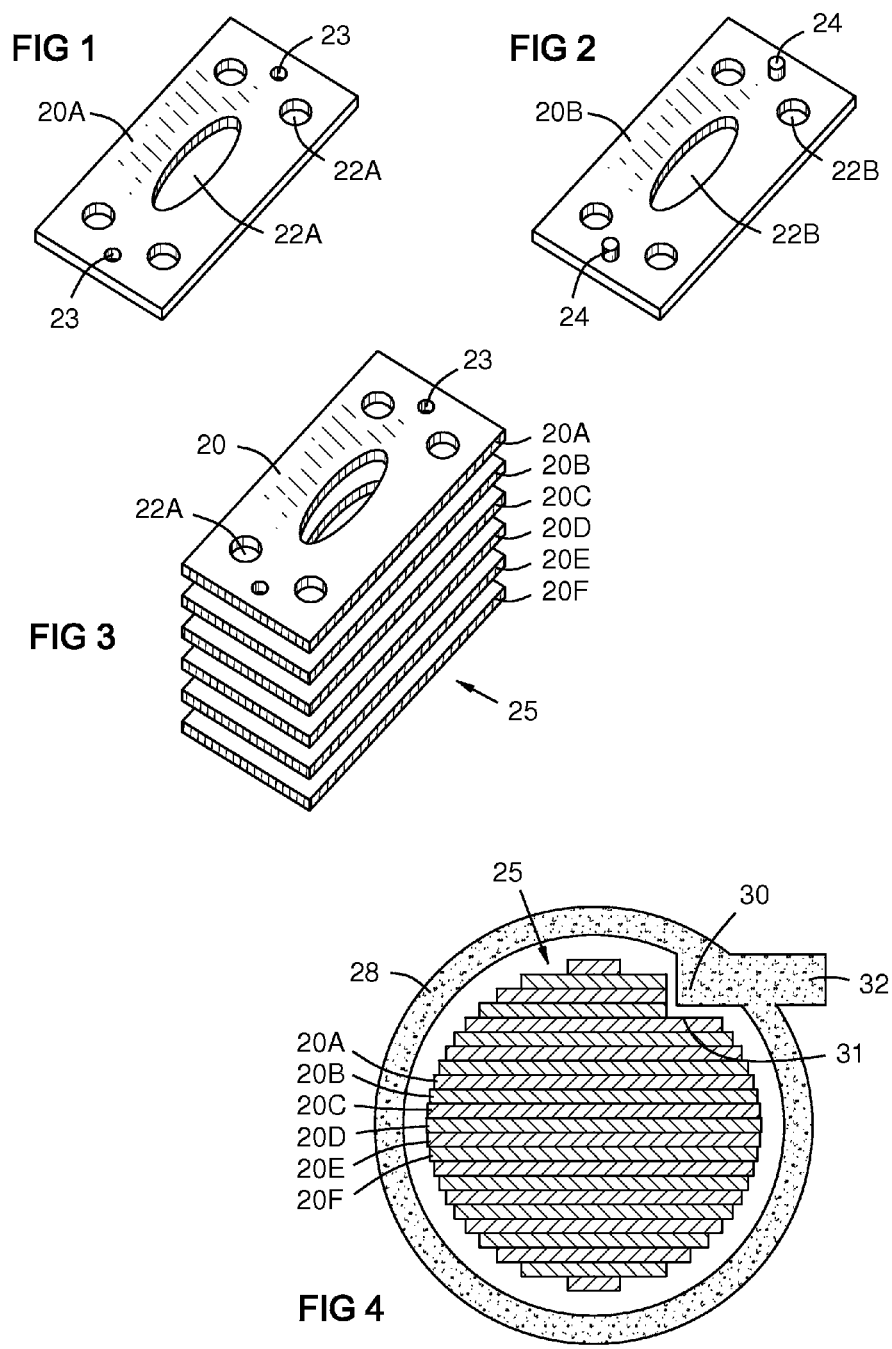

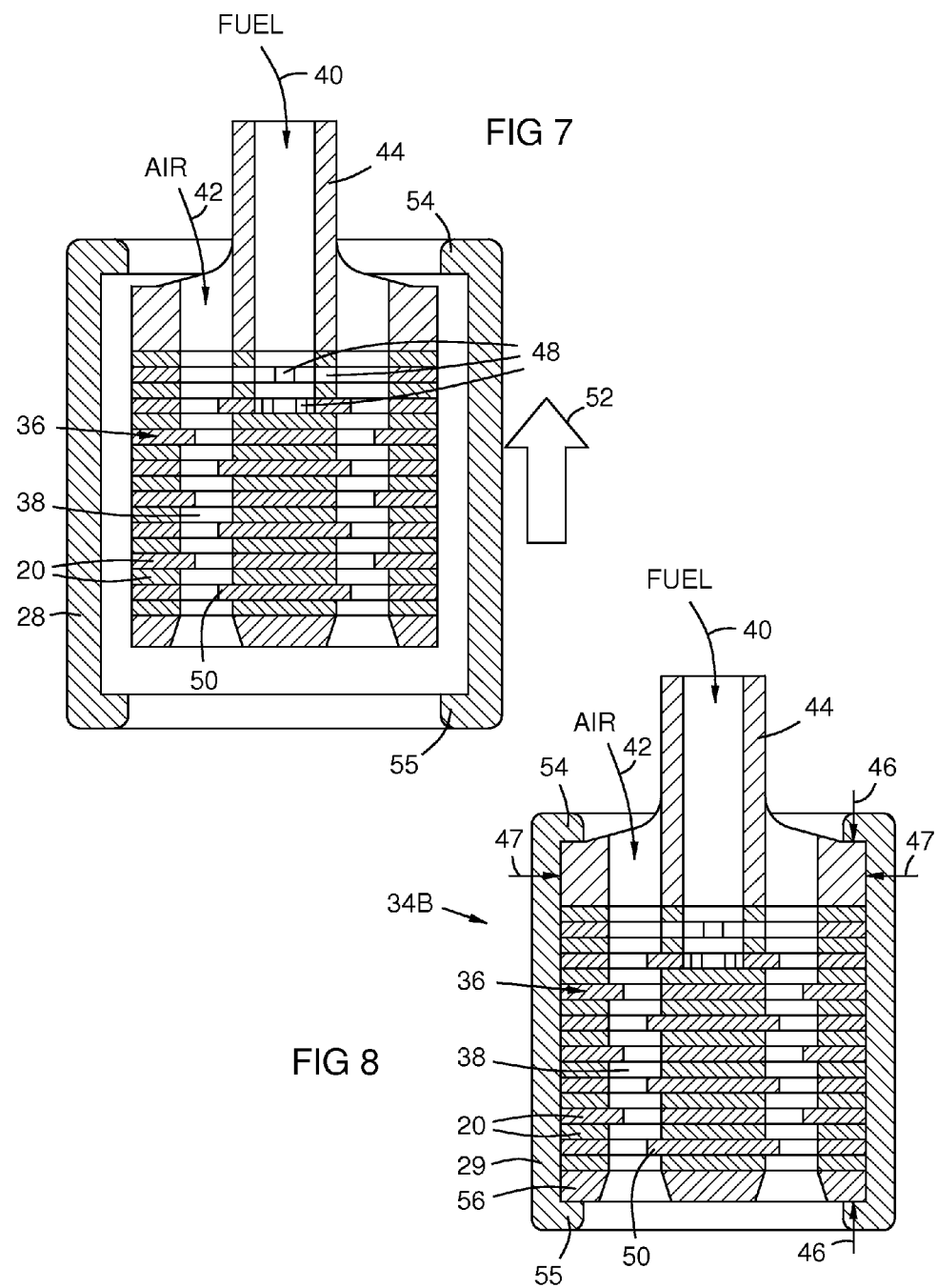

HYBRID MANUFACTURING PROCESS AND PRODUCT MADE USING LAMINATED SHEETS AND COMPRESSIVE CASING

FIELD OF THE INVENTION

This invention relates to methods of manufacturing components with complex internal passages, including gas turbine components.

BACKGROUND OF THE INVENTION

It is difficult to manufacture components with complex internal geometries. Although precision investment casting is often used to manufacture components with internal cavities, the complexity of the passages is limited by the casting core and the ability to flow material within a mold. Intricate cores are fragile, and may not withstand the casting process. Machining of internal features is usually limited to line-of-sight processes.

There are various additive manufacturing techniques such as Direct Laser Metal Sintering (DMLS) that are capable of building components layer-by-layer from sintered powder. Although such techniques are suitable for making prototypes and for limited production, they are not economical for large scale production. Additionally, the surfaces of laser-sintered materials can be unacceptability rough.

In stacked laminate construction, a component is constructed from multiple layers of sheet or foil material. Each individual sheet can be easily machined to form cutouts. The component is then built by stacking the sheets. The sheets can be registered with the cutouts aligned to form complex internal geometries. A limitation of the stacked laminate approach is the ability to reliably bond each layer. Some materials such as superalloys Haynes® 230 and 282 that are otherwise desirable are difficult to bond into a laminated structure. This limits the choice of materials that can be used for laminated construction.

BRIEF DESCRIPTION OF THE DRAWINGS

The invention is explained in the following description in view of the drawings that show:

FIG. 1 is a perspective view of a first sheet of material with a pattern of holes, including two registration holes.

FIG. 2 is a perspective view of a second sheet of material with a pattern of holes and two registration pins.

FIG. 3 shows stacking of sheets to form a stacked core structure with internal channels.

FIG. 4 shows a green-state casing preform surrounding a stacked core structure.

FIG. 7 shows a casing preform sliding over a stacked core structure to form a fuel injector.

FIG. 8 shows the fuel injector formed from FIG. 7, including a pressure plate.

DETAILED DESCRIPTION OF THE INVENTION

Figure 5:
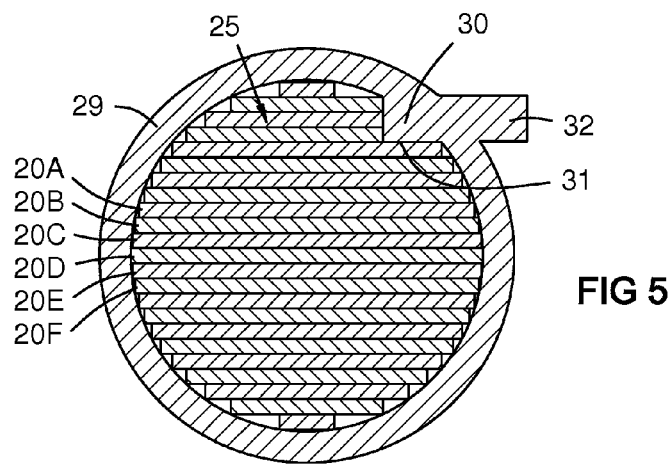
FIG. 5 shows the assembly of FIG. 4 after processing shrinkage of the casing.

An aspect of the invention is a method of manufacturing components with complex internal features. The method utilizes a combination of two manufacturing technologies. A component core is made from a series of stacked sheets or foils, and an outer casing is manufactured using a process that compresses the casing on the core.

FIG. 1 shows a sheet of material 20A with cutouts 22A and registration holes 23.

FIG. 2 shows a second sheet of material 20B with corresponding cutouts 22B and registration pins 24. FIG. 3 shows a stack 25 of sheets 20A-20F being assembled. The registration pins 24 fit into the registration holes 24 to register adjacent sheets so that cutouts 22A align with or overlap the corresponding cutouts 22B in adjacent sheets to define passages in the stack. Cutout patterns in each sheet may be formed using methods such as drilling/milling, laser cutting, water-jet cutting, stamping, and photochemical machining.

The registration pins 24 may be formed by molding, DMLS, or other methods. Alternately, the sheets may be registered in a jig or mold, and may be bonded together by a method such as diffusion bonding or adhesive. Alternately registration holes may be formed through every sheet in the stack 25, and long registration pins may be inserted through all the sheets.

FIG. 4 shows a casing preform 28 that is placed or formed around a core stack 25. The casing preform may be formed of a material that shrinks during processing. In this context the phrase "shrinks during processing" does not mean simply thermal contraction. It means permanent shrinkage as measured at the same temperature before and after processing. Examples of such materials are ceramic green-bodies and sinterable metal power mixed with a binder such as a polymer. Herein, "green body" or "green state" means a preform prior to processing shrinkage. The preform may be designed and dimensioned to shrink into compression upon the stack 25 as the casing preform is processed. The preform may be manufactured by injection molding or other methods. It may have one or more registration elements 30 that mate with corresponding elements 31 on the stack; for example tongue-and-groove elements. It may have an exterior mounting element(s) 32.

FIG. 5 shows the casing 29 after processing, which reduces its volume, compressing the sheets of the core 25 together, and preventing their separation. The sheets may be bonded together or not, and may be bonded to the casing or not. Sintered metal and ceramic casings may develop a final density close to 100%. The casing may shrink up to about 20%, depending on the material. For sinterable powder materials, the shrinkage amount is largely determined by the particle constituents, their size/shape distribution, and the binder materials and proportion. These parameters may be selected in conjunction with the geometry and dimensions of the preform to produce a desired amount and distribution of compression on the sheets 20A-20F.

Figure 6:
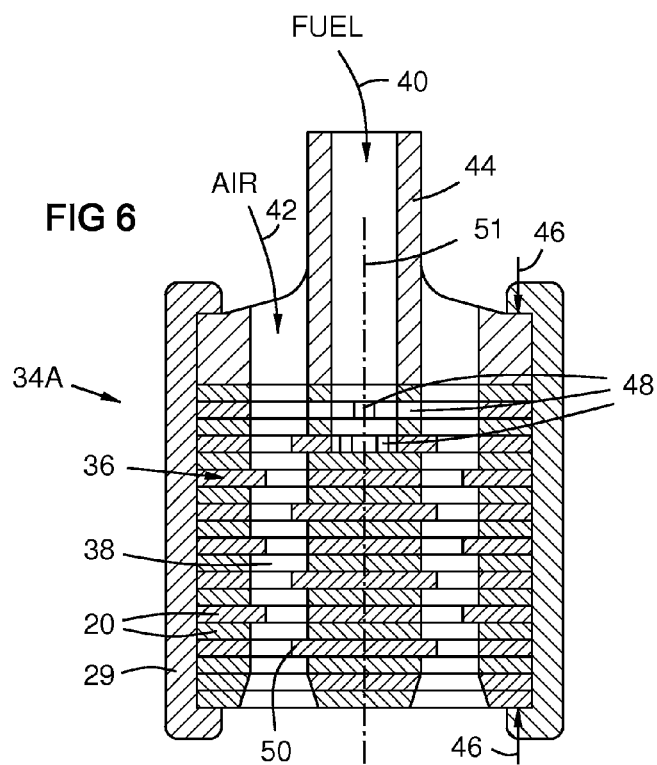
FIG. 6 shows a fuel injector formed of a stacked core and casing.

FIG. 6 shows a gas turbine fuel injector 34A made of a cylindrical stack 36 of sheets of material 20 in a casing 29. Cutouts in the sheets align to form internal passages 38 for mixing fuel 40 and air 42. A fuel and air inlet element 44 may be placed on one end of the stack. The casing 29 may span both the stack 36 and the inlet element 44 such that the casing compresses 46 the inlet element 44 against the stack 36. The inlet element 44 may be tubular as shown or other shapes, and it may be formed by any method, such as casting or molding. Fuel ports 48 may pass fuel into the mixing passages 38. Turbulators 50 may be provided in the mixing passages 38 to effectively mix the fuel and air. Stacked core structures for fuel injectors and other components may be designed in various shapes, including cylindrical, barrel-shaped, prismatic polyhedral, and irregular. An axis 51 is defined herein as a geometric central line normal to the planes of the sheets 20. It may be an axis of rotational symmetry if the stack has such symmetry, but this is not a requirement of the invention. Herein "radial" means in a direction perpendicular to such axis.

FIG. 7 shows a geometry that allows the casing preform 28 to slide 52 over the stack 36 and the inlet element 44. Inwardly extending lips 54 on the top end of the casing preform just clear the outer diameter of the stack 36. Inwardly extending lips 55 on the bottom end of the preform are not so limited. FIG. 8 shows the resulting fuel injector 34B after about 20% shrinkage of the casing. The green body casing may be designed to shrink a given amount such as 18-20% to allow clearance for sliding assembly. The dimensions of the preform may be designed to provide a uniform or non-uniform distribution of compression stresses around the stack 36 and the inlet element 44. For example, the axial compression 46 may be greater than the radial compression 47. A pressure plate 56 may be provided to distribute axial force from the lips 55 onto the end of the stack 36. The pressure plate 56 may be for example at least twice as thick as an average sheet thickness among the sheets of the stack and may be formed of the same or a different material than the other sheets of the stack.

Figure 9:
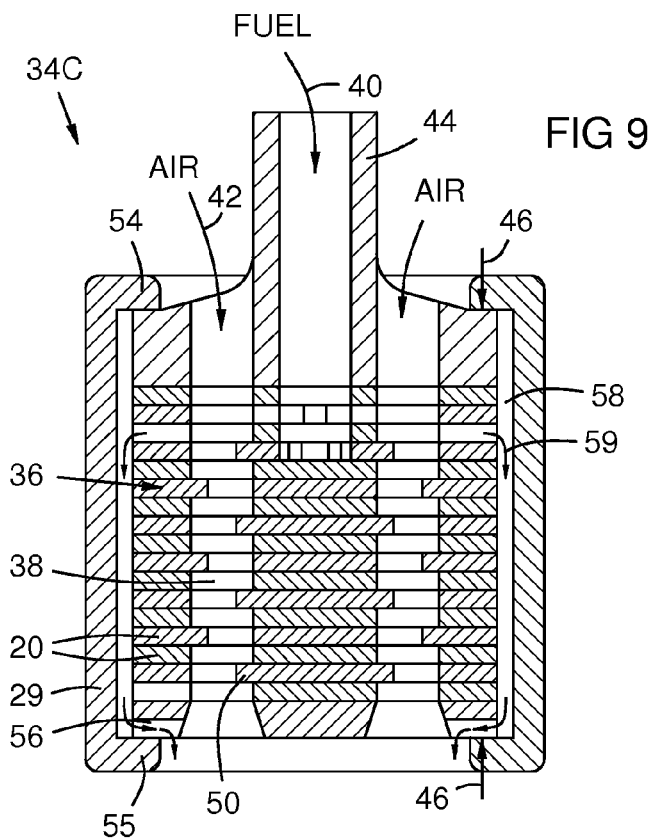
FIG. 9 shows a fuel injector with air bypass clearance between the casing and the core structure.

FIG. 9 shows a fuel injector embodiment 34C with an air bypass clearance 58 between the stack 36 and the casing 29 that allows some air 59 to bypass the mixing channels 38 to provide near-wall cooling of the casing 29 or for other purposes. In this embodiment, the casing preform may be designed with an inner diameter large enough to leave the radial clearance 58 after shrinkage. Alternately, a fugitive material may be formed on the outer diameter of the stack, and a casing preform 28 may be bi-cast over the fugitive material, which may be chemically removed after sintering and/or other processing.

Figure 10:
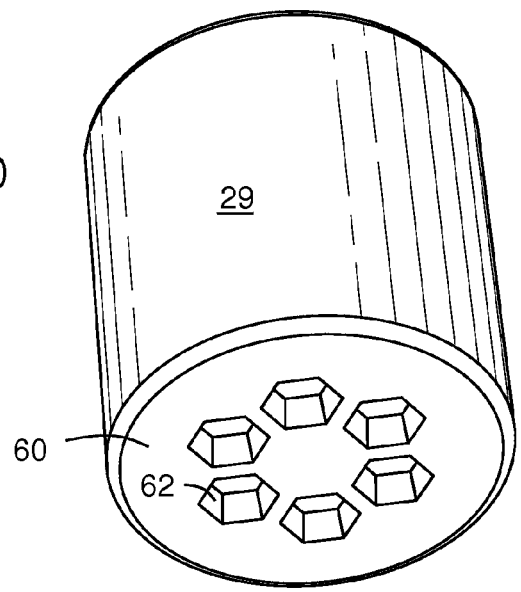
FIG. 10 shows a cup-shaped casing embodiment with outlets.

FIG. 10 shows a cup-shaped casing 29 having a bottom 60 with outlets 62. These outlets may diverge from the inside to the outside surface of the casing 29 as shown to act as diffusers, and they may have a hexagonal shape as shown. One or more circular arrays of such outlets may be provided, and they may nest in a honeycomb pattern for space efficiency. Such a cup-shaped casing in green-body form may slide over the stacked core as shown in FIG. 7.

Figure 11:
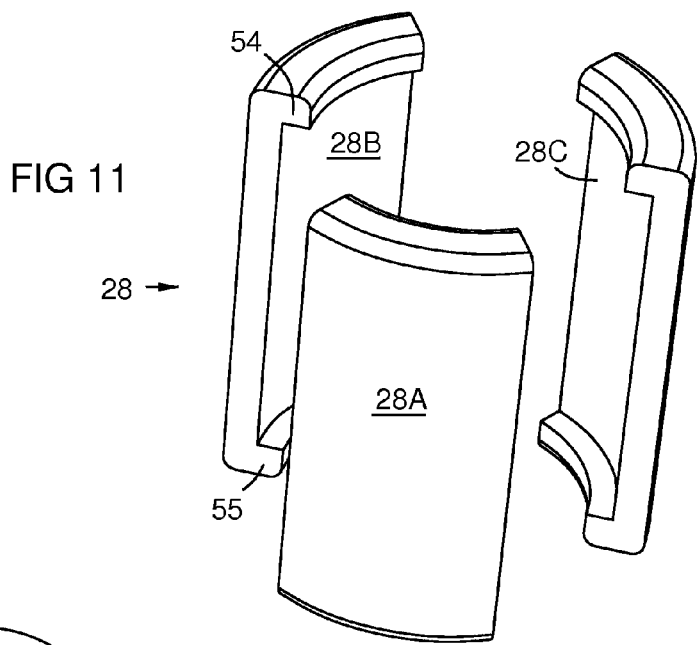
FIG. 11 shows a segmented casing embodiment.

FIG. 11 shows a segmented casing 29 with two or more segments 29A, 29B, 29C rotationally symmetrically spaced around the circumference of the stacked core. Each segment spans a portion of the core. The lips 54, 55 may extend inward as far as desired since they do not need to slide over the core as in FIG. 7. The segments may fully encircle the sides of the stacked core. However, in the example of FIG. 11, each of three segments 29A, 29B, and 29C covers 60 degrees of cylinder, leaving 60 degrees between adjacent segments.

Figure 12:
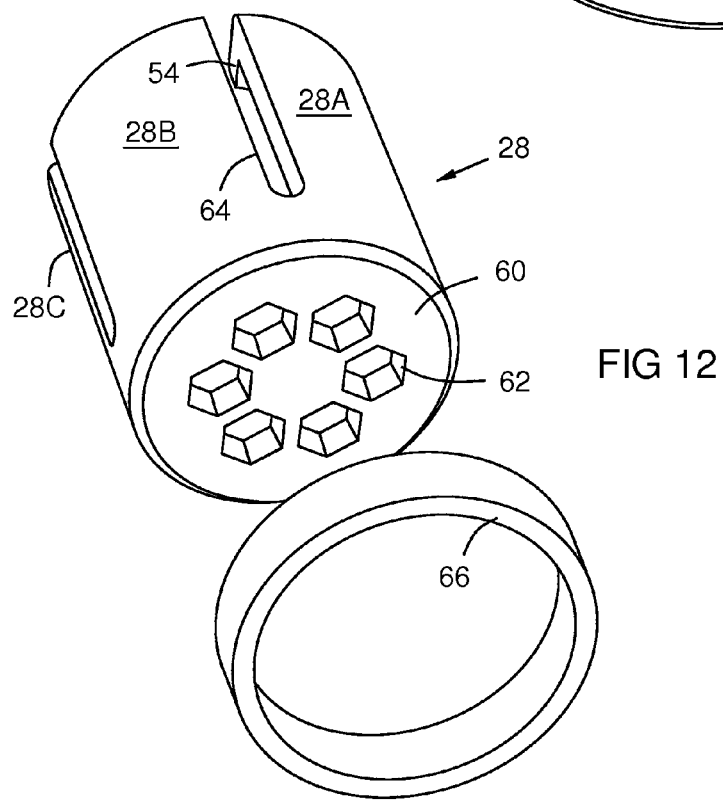
FIG. 12 shows a cup-shaped segmented casing embodiment with hoop.
Figure 13:
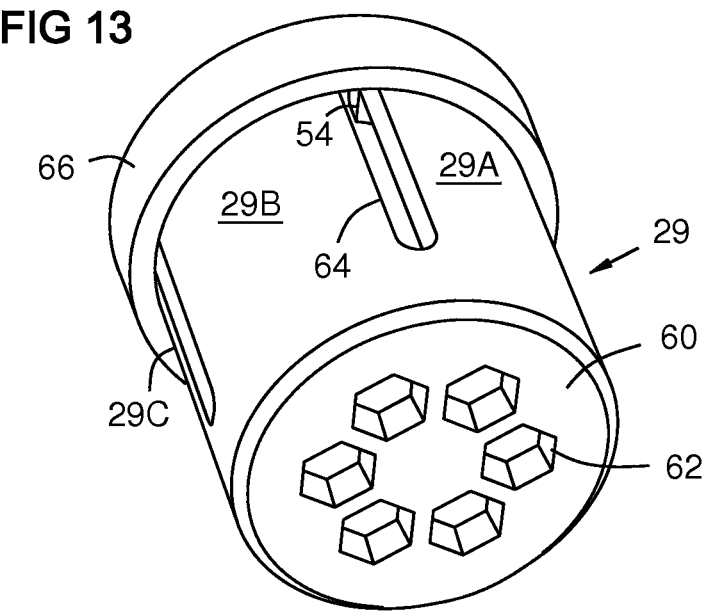
FIG. 13 shows the casing of FIG. 12 after assembly.

FIG. 12 shows a cup-shaped and segmented casing preform 28, having a bottom 60 with outlets 62 as previously described. Side segments 28A, 28B, 28C are separated by slots 64. In this example there are four side segments, one of which is hidden. It is suggested that at least 4 segments be provided in this embodiment. This preform 28 can slide over the stacked core by flexing the segments outward, which allows the lips 54 to extend further inward than with a non-flexing preform. One or more hoops 66 may be formed of a material that shrinks during processing, particularly a sinterable material, and especially the same material as the casing. The hoops may be are compressed around the casing during processing in the embodiments of FIGS. 11 and 12. Each hoop may be formed into a preform, slipped over the casing preform 28 after assembly of the preform onto the stack, and sintered with the casing or otherwise processed into compression thereon. FIG. 13 shows a hoop 66 assembled onto the casing 29.

The process herein overcomes limitations associated with poor interfacial bond strength between sheet layers. A stacked sheet core of a component is encased within an outer casing. Precise, three-dimensional features can be produced in both the stacked core and the casing preform. These features may be designed to accurately fixture the components during processing and improve dimensional tolerances. A stacked core of a component can now be made of materials that have excellent heat tolerance or other desirable characteristics, but that are not easily bonded together, such as Haynes 230 and/or 282 superalloys.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of making a component, comprising:
   forming a plurality of sheets of material wherein at least some of the sheets have a respective pattern of cutouts there through;
   stacking the sheets in a predetermined registration that aligns or overlaps at least some of the cutouts in adjacent ones of the sheets to form a stack of the sheets with internal passages;
   forming a casing preform comprising a material that permanently shrinks during processing, as measured at the same temperature before and after processing, the preform having a geometry effective to compress the sheets together in a processed state of the casing preform;
   spanning the stack with the preform;
   processing the preform effective to shrink it to form a casing that compresses the stack of sheets together; and
   shaping and dimensioning the preform to slide over the stack before processing, and providing respective cooperating elements on the preform and the stack that mate and register the casing with respect to the stack.

2. The method of claim 1, further comprising bonding the stack of sheets together to form a stacked laminate, and forming the casing to bracket at least portions of opposed ends of the stack, preventing delamination of the stack.

3. The method of claim 1, wherein the mating elements are tongue and groove elements that slidably engage between the stack and the preform.

4. The method of claim 1, wherein:
   the casing preform comprises a green-state sinterable metal or ceramic; and
   the processing comprises heating the preform effective to shrink it to form the casing that compresses the stack of sheets together.

5. A method of making a component, comprising:
   forming a plurality of sheets of material wherein at least some of the sheets have cutouts there through;
   stacking the sheets in a predetermined registration that aligns or overlaps at least some of the cutouts in adjacent ones of the sheets to form a stack of the sheets with internal passages;
   spanning the stack of sheets with a green-body casing preform comprising a sinterable material;
   shaping and dimensioning the preform to create compression upon the stack that compresses the sheets against each other when the sinterable material of the casing preform is in a sintered state; and heating the preform to a temperature and for a duration effective to sinter and shrink the preform to form a casing that compresses the stack of sheets.

6. The method of claim 5, further comprising placing an inlet element on one end of the stack, and spanning the stack and the inlet element with the preform wherein the casing compresses the inlet element against said one end of the stack.

7. The method of claim 5, further comprising forming the preform in at least two segments spaced symmetrically about an axis of the stack, each segment comprising inward extending lips that bracket portions of the opposed ends of the stack.

8. The method of claim 5, further comprising:
   forming the preform in a cup shape comprising a bottom with a plurality of outlets, and sliding the preform over the stack.

9. The method of claim 8, further comprising:
   forming sides of the cup-shaped preform in segments separated by slots, wherein each segment has a top end with an inwardly extending lip;
   spreading the segments to slide the preform over the stack of sheets; and sliding a hoop comprising the sinterable material over the segments, and
   sintering the preform and the hoop.

10. The method of claim 5 further comprising:
    forming registration pins on a first subset of the sheets;
    forming registration holes in a second subset of the sheets; and
    engaging the registration pins in the registration holes, registering the sheets relative to each other.

11. The method of claim 5, further comprising:
    adding a fluid inlet element to one end of the stack; and
    spanning and bracketing the stack and the fluid inlet element with the preform;
    wherein the casing compresses the stack and the fluid inlet element together.

12. The method of claim 5, further comprising:
    adding a pressure plate to one end of the stack, wherein the pressure plate is at least twice as thick as an average thickness of the sheets; and
    spanning and bracketing the stack and the pressure plate with the preform;
    wherein the casing compresses the stack and the pressure plate together.

13. The method of claim 5, further comprising:
    forming the sheets with circular sides;
    forming the stack with cylindrical or barrel shaped sides and opposed ends;
    forming the internal passages to pass through the stack between the opposed ends thereof; and
    forming the preform to form a casing that spans the sides of the stack and brackets some opposed portions of the opposed ends of the stack, wherein the casing compresses the sheets together, forming a fuel injector for a gas turbine.

14. The method of claim 5, further comprising:
    placing an air and fuel inlet element on a top end of the stack, wherein further internal passages of the air and fuel inlet element register with the internal passages of the stack; and
    forming the preform to form a casing that spans the sides of the stack and engages the air and fuel inlet element and a bottom end of the stack, wherein the casing compresses the air and fuel inlet element and the sheets together.

15. The method of claim 5, further comprising:
    forming the preform from a sinterable material comprising constituents and proportions that provide 18-20% sintering shrinkage of the preform to a final densified state of the casing;
    forming the preform with inwardly extending lips that engage opposed ends of the stack;
    sliding the preform axially over the stack, then sintering the preform into at least axial compression on the stack.

16. The method of claim 5, further comprising forming the preform by bi-casting the preform material on the stack of sheets.

* * * * *